Oct. 1, 1946.   L. L. MALLARD   2,408,666
ANTIFRICTION GEARING
Filed Aug. 20, 1943   2 Sheets-Sheet 1

Inventor
L. L. Mallard
By Ayates Dowell, Attorney

Oct. 1, 1946.   L. L. MALLARD   2,408,666
ANTIFRICTION GEARING
Filed Aug. 20, 1943   2 Sheets-Sheet 2

Fig. 4ᵃ.

Inventor
L. L. Mallard

Patented Oct. 1, 1946

2,408,666

UNITED STATES PATENT OFFICE 2,408,666

ANTIFRICTION GEARING

Logan L. Mallard, Norfolk, Va.

Application August 20, 1943, Serial No. 499,401

7 Claims. (Cl. 74—464)

This invention relates to anti-friction gears of the type utilizing balls or rollers in place of teeth. In certain installations where intermeshing drive gears are employed, it is desirable to produce idling of the gears on quick notice without adjusting the gears or moving the latter bodily, and an object of the present invention is to provide gears capable of obtaining such result.

Another object is to provide a gear of the type specified wherein the balls or rollers on the periphery thereof may be individually removed and replaced in an easy and expeditious manner to compensate for wear and avoid play or backlash between coacting gears.

Another object is to provide a gear of the anti-friction type utilizing parts which may be fabricated with relative ease, and wherein the parts which are normally subjected to heavy wear may be readily removed and replaced.

A further object is to generally improve and render more flexible in use gears of the anti-friction type.

Figure 1:
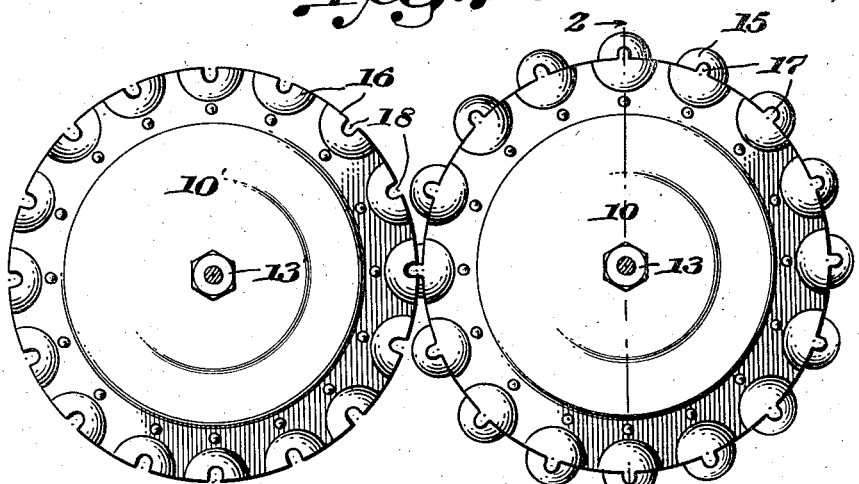
Figure 6:
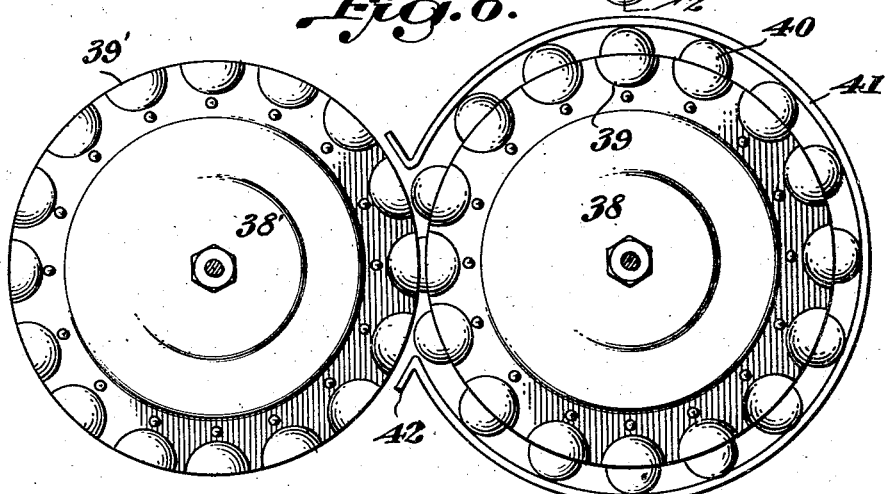
Figure 7:
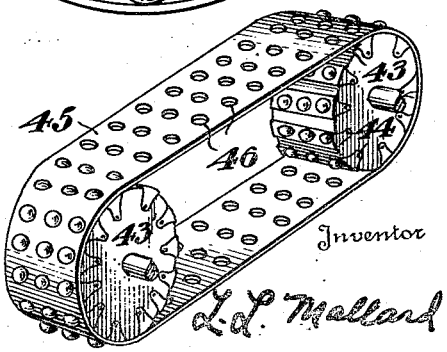
Figure 2:
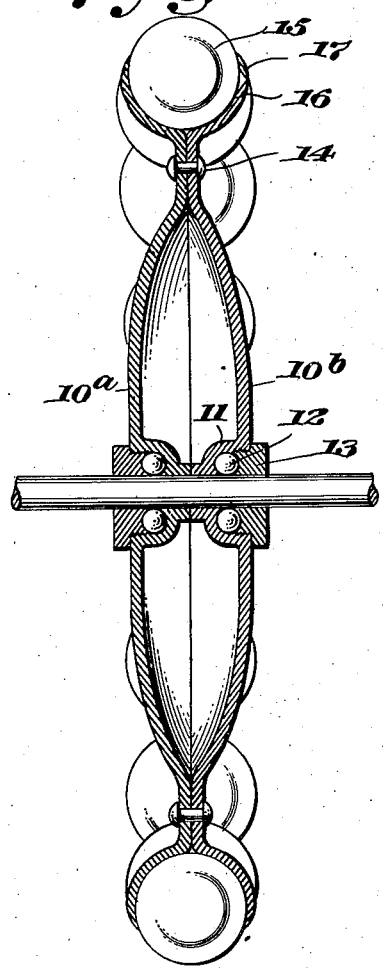
Figure 3:
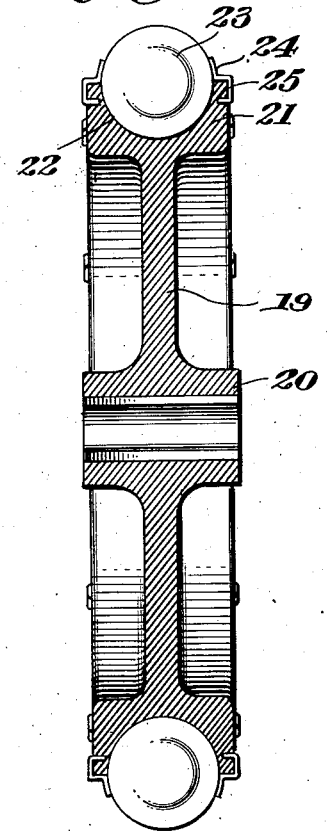
Figure 4:
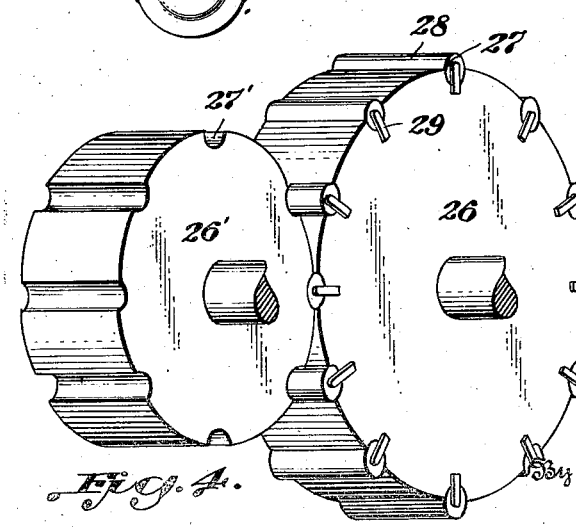
Figure 5:
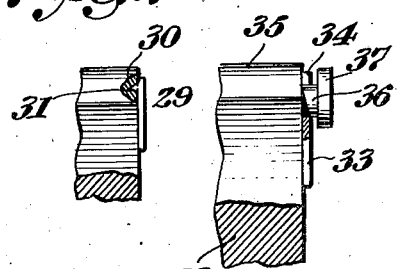

The foregoing and other objects and advantages of the invention will become apparent in view of the following description taken in conjunction with the drawings, wherein:

Figure 1 is a view in side elevation of a set of anti-friction gears constructed in accordance with the invention;

Fig. 2, a section taken substantially on the line 2—2, Fig. 1;

Fig. 3, a substantially central axial section of a modification with respect to the gears shown in Figs. 1 and 2;

Fig. 4, a view in perspective of a set of anti-friction gears of the roller type embodying features of the invention;

Fig. 4a, a fragmentary view of Fig. 4 illustrating the manner in which the rollers are mounted on the periphery of the gear;

Fig. 5, a view similar to Fig. 4a of a modification;

Fig. 6, a view in side elevation of a further modified ball type gear with respect to that shown in Fig. 1; and Fig. 7, a view in perspective of a set of anti-friction gears and a flexible connecting or drive member especially designed for this type of gearing.

Referring to the drawings in detail, and first to Figs. 1 and 2, the gears herein illustrated each comprise a body 10 or 10' made up of opposed plates 10a and 10b, which may consist of a pair of stampings formed with bearing recesses or cups 11 adapted to receive ball bearings 12 which are held in place by hub caps or nuts 13 or 13'. The stampings which make up the body of the wheel may be rigidly connected to one another by means such as rivets 14.

Mounted on the periphery of the gear 10 are a series of balls 15 which are disposed in bearing sockets or recesses 16 defined by forming smooth rounded cavities in the peripheries of the mated stampings. Approximately on the radial center line of each bearing socket, resilient ball-retaining members 17 project radially outwardly from the peripheries of the plates 10a, 10b. The members 17 may be made up of separate pieces of resilient metal and welded to the peripheries of the sections 10a and 10b, or they may be formed as part of the sections, depending upon the size and type of gear to be used and the metal or material from which the sections are made.

The retaining members 17 should be projected sufficiently beyond the axis of each ball to retain the latter within its socket and at the same time permit insertion and removal of the balls without undue effort. These members take very little if any thrust when the gears are in operation due in part to the arrangement and construction of the companion gear 10'.

The gear 10' of Fig. 1 is constructed in substantially the same manner as the gear 10, except that in this instance the sockets or cavities 16' are adapted to mesh with or receive the balls 15 of the gear 10 when the gears are in motion, and the opposed side walls of these sockets are formed with recesses 18 to accommodate the resilient retainers 17.

In operation, the gear 10 may be readily loaded with a suitable number of balls 15 simply by inserting the latter in the cavities provided therefor by the retainers 17. When the gears are in motion or are rotating, the balls 15 mesh with the cavities 16' of the gear 10', thereby transmitting motion from one gear to the other. Whenever it is desired to remove the balls 15 to permit idling of the two gears, it is only necessary to exert sufficient pull thereon to break their grip with the retainers 17, and since there is little lateral pressure tending to displace the balls from their seats or sockets, the retainers 17 need not necessarily exert any great force on the ball. The balls 15 are individually removable and replaceable, so that whenever any one or more of the same become worn, they may be readily substituted by new or reprocessed balls to avoid any play or backlash between the two gears.

Fig. 3 illustrates a gear of modified construction with respect to that shown in Figs. 1 and 2. In this instance, the gear body is indicated at 19 and is formed with a hub 20 and a peripheral or rim portion 21, the latter being formed with a series of bearing sockets 22 adapted to receive balls 23. To retain the balls in place, resilient spring clips 24 are inserted in recesses 25 formed in the sides of the rim. The clips 24 may be held in place due to friction, or they may be welded to the sides of the rim. As illustrated herein, they are given a press fit in the recesses provided therefor.

As in the type of gear illustrated in Figs. 1 and 2, the balls 23 may be readily removed and replaced simply by exerting sufficient pull or push thereon to spread the clips 24. This type of gear is more rugged than the types shown in Figs. 1 and 2 and may therefore be considered a heavy duty type of gear.

Figs. 4 and 4a illustrate a gear of the type utilizing rollers on the periphery thereof instead of spherical members or balls. In this instance the bodies of the gears are indicated at 26 and 26', said gears being provided with peripheral grooves 27 and 27' extending transversely thereacross. The gear 26 is provided with a series of rollers 28 detachably mounted in the grooves 27 and held in place by means of spring clips 29 which at their inner extremities may be welded to the sides of the gear and are each provided with a pointed bearing projection 30 adapted to engage in recesses or cavities 31 formed in the opposite ends of each roller 28. The members 29 are of flexible or spring material, such as spring steel, so that they will "give" outwardly when the rollers are inserted or removed from their sockets or grooves 27. The rollers 28 of the gear 26 are adapted to engage in the grooves 27' when the gears are in motion, as will be obvious.

In Fig. 5 a modification in structure is illustrated with respect to that shown in Figs. 4 and 4a. In this instance, the gear is indicated at 32 and has secured on the sides thereof a series of retainers 33 each of which at its outer extremity if forked with the ends of the fork terminating in resilient clips 34. Each roller 35 is formed with a neck portion 36 and an end enlargement 37, the necks 36 of the rollers being adapted to be sprung between the clips 34 and into the forks provided by the members 33.

In Fig. 6, a set of ball-teeth gears are shown and indicated at 38 and 38'. These gears may be of substantially the same construction as those illustrated in Figs. 1 and 2, being provided with a series of peripheral bearing sockets 39 and 39', the sockets 39 being adapted to receive a series of balls 40 which engage in the sockets 39' when the gears are in motion. In this instance, however, the balls 40 are retained in place by a cover 41, which may be made of resilient material so that it may be sprung in place, the opposite ends of the cover being reversely bent or turned as at 42 and spaced apart to permit proper meshing of the gears. The cover may be supported in any suitable manner from a point adjacent the gear to which it is applied. It will be obvious that in this instance the balls cannot be removed individually as readily as can be done in the forms shown in Figs. 1 and 2.

Fig. 7 illustrates a flexible drive connection for gears of the ball type. In this instance the gears are indicated at 43 and 43' and have a series of balls or spherical members 44 disposed in the peripheries thereof. A belt 45, which may be made of flexible material, such as spring steel or the like is trained over the gears and has formed therein a plurality of holes 46 adapted to mesh with the balls 44. The balls 44 are arranged in transverse rows and detachably held in place by means of retainers 47 each of which has radially inwardly extending resilient portions 48 at opposite ends provided with pointed projections which engage in recesses or sockets formed in the sides of the gears.

It will be understood that certain limited changes in construction and design may be adopted without departing from the spirit or scope of the invention as defined by the appended claims.

What is claimed is:

1. Anti-friction gearing including a pair of coacting transmission members, one of which is formed with bearing recesses on the periphery thereof and a series of rotatable anti-frictional elements disposed in said recesses and the other of which is provided with a series of recesses in its periphery adapted to receive said bearing elements when the transmission members are in motion, and resilient retainer members projecting radially from said first-named transmission member and engaging said anti-frictional elements in the transverse axial regions thereof to detachably maintain the latter in the bearing recesses provided therefor.

2. Anti-friction gearing including a pair of coacting gears each having in the periphery thereof a series of hemispherical recesses, one of said gears having a plurality of spherical elements disposed within its recesses and adapted to engage in the recesses of the companion gear when the gears are in motion, and a series of radially projecting resilient retainers on the gear carrying the spherical elements, said retainers projecting radially beyond the transverse axial region of said elements and exerting a resilient clamping pressure thereon to detachably retain the elements in their sockets.

3. Anti-friction gearing including a pair of coacting gears each having on the periphery thereof a series of hemispherical sockets, one of said gears having a plurality of spherical elements disposed in said sockets and adapted to engage in the sockets of the companion gear when the gears are in motion, and a series of radially projecting resilient retainers on the gear carrying the spherical elements, said retainers projecting radially beyond the transverse axis of said spherical elements and exerting a resilient clamping pressure thereon to detachably retain the elements in their sockets, the other of said gears being formed with recesses on opposite sides of its sockets open to the periphery of the gear adapted to register with said resilient retainers when the gears are in motion.

4. Anti-friction gearing including a gear having a series of ballbearing cavities in the periphery thereof, a series of balls mounted in said cavities, the peripheral edges of the gear on opposite sides of the transverse axial center line of each ball being provided with radially projecting resilient retainers adapted to engage the ball and detachably holding the latter in its socket, and a coacting gear also formed with a series of hemispherical sockets in the periphery thereof adapted to receive said balls when the gears are in motion.

5. An anti-friction gear comprising a pair of stampings adapted to be secured to one another, the peripheral portions of said stampings having formed therein a series of recesses which when the stampings are mated provide hemispherical bearing recesses or cavities, a series of balls mounted in said recesses, and resilient retaining members projecting radially from the periphery of the gear and engaging said balls to removably retain them in their sockets.

6. An anti-friction gear comprising a gear body having formed in the periphery thereof a series of bearing cavities, rotatable bearing elements mounted in said cavities, and resilient retainers carried by the sides of the gear and projecting radially beyond the transverse axis of said rotatable elements and engaging the latter under tension to detachably retain the elements in their cavities.

7. An anti-friction gear comprising a gear body having formed on the periphery thereof a plurality of bearing sockets, spherical elements disposed in said sockets, and resilient retainers for said elements, said resilient retainers consisting of spring clips carried by the sides of the gear and projecting radially and engaging the spherical elements to detachably maintain the latter in their sockets.

LOGAN L. MALLARD.